June 12, 1956     G. V. CONSTANTAKIS     2,749,980
ELONGATED LEVER MEMBERS FOR LACERATING TIRE TREAD
Filed Dec. 4, 1953     3 Sheets-Sheet 1

INVENTOR.
GEORGE V. CONSTANTAKIS
BY
Irwin M. Lewis
ATTORNEY.

INVENTOR.
GEORGE V. CONSTANTAKIS
BY
Irwin M. Lewis
ATTORNEY.

June 12, 1956 G. V. CONSTANTAKIS 2,749,980
ELONGATED LEVER MEMBERS FOR LACERATING TIRE TREAD
Filed Dec. 4, 1953 3 Sheets-Sheet 3

INVENTOR.
GEORGE V. CONSTANTAKIS
BY
Irwin M. Lewis
ATTORNEY.

United States Patent Office 2,749,980
Patented June 12, 1956

2,749,980

ELONGATED LEVER MEMBERS FOR LACERATING TIRE TREAD

George V. Constantakis, Allen Park, Mich., assignor to United States Rubber Company, New York, N. Y., a corporation of New Jersey Application December 4, 1953, Serial No. 396,297

7 Claims. (Cl. 164—10.2)

This invention relates to apparatus for slitting or grooving the tread of a rubber vehicle tire to increase the traction thereof.

The primary object of the invention is to provide a tire tread slitting or grooving apparatus of simple, inexpensive construction which may be used by comparatively unskilled operators to lacerate the tread of a tire while it is still mounted on a vehicle.

Other objects and advantages of the present invention will become apparent from the following description when read in conjunction with the accompanying drawing wherein.

Figure 1:
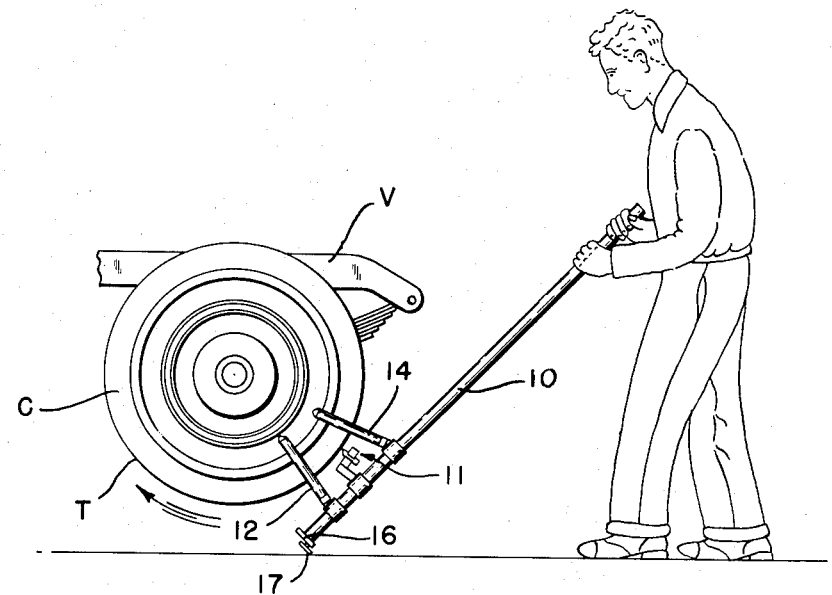
Fig. 1 is an elevational view showing the apparatus of the invention in position for slitting or grooving the tread of a jacked-up vehicle tire.

Referring to the drawings and in particular to Fig. 1 of the drawings, the apparatus of the present invention includes an elongated lever member 10 in the form of a steel pipe by which a slitting or grooving tool 11 adjustably secured thereto can be pressed against the tread T of a rotating, jacked-up tire C of a vehicle V to slit or groove the tread T.

Figure 2:
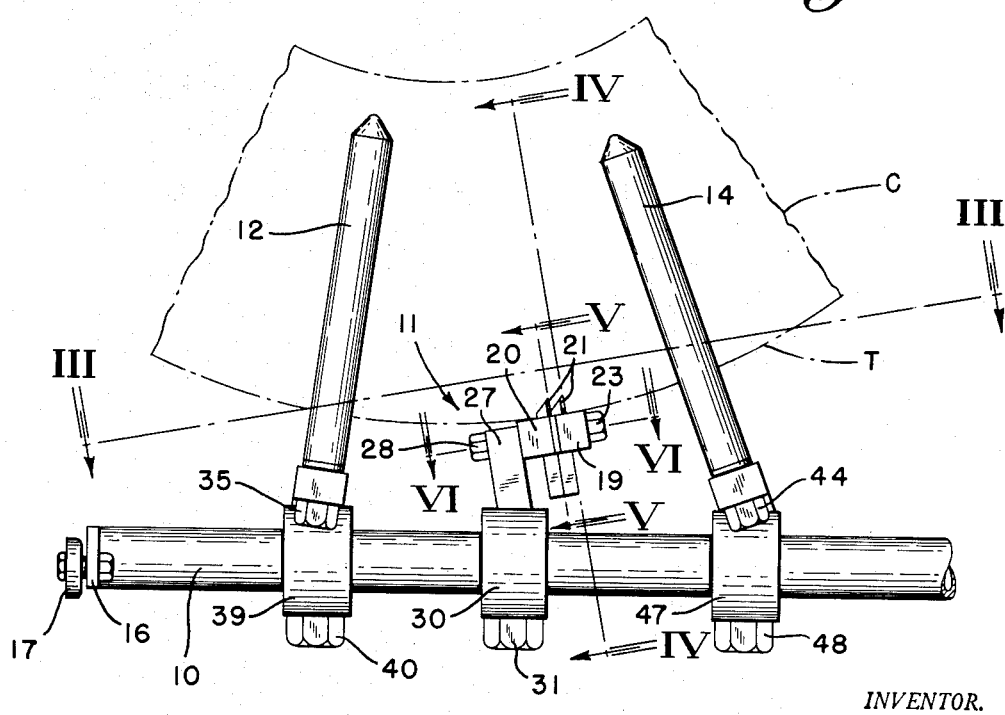
Fig. 2 is an enlarged sectional view of the tire engaging portion of the apparatus.
Figure 4:
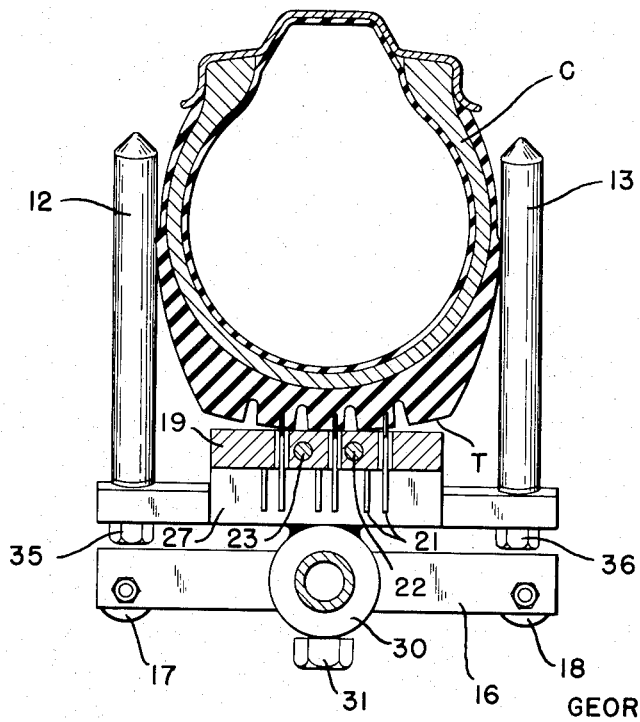
Fig. 4 is a sectional view taken on the line IV—IV of Fig. 2.
Figure 5:
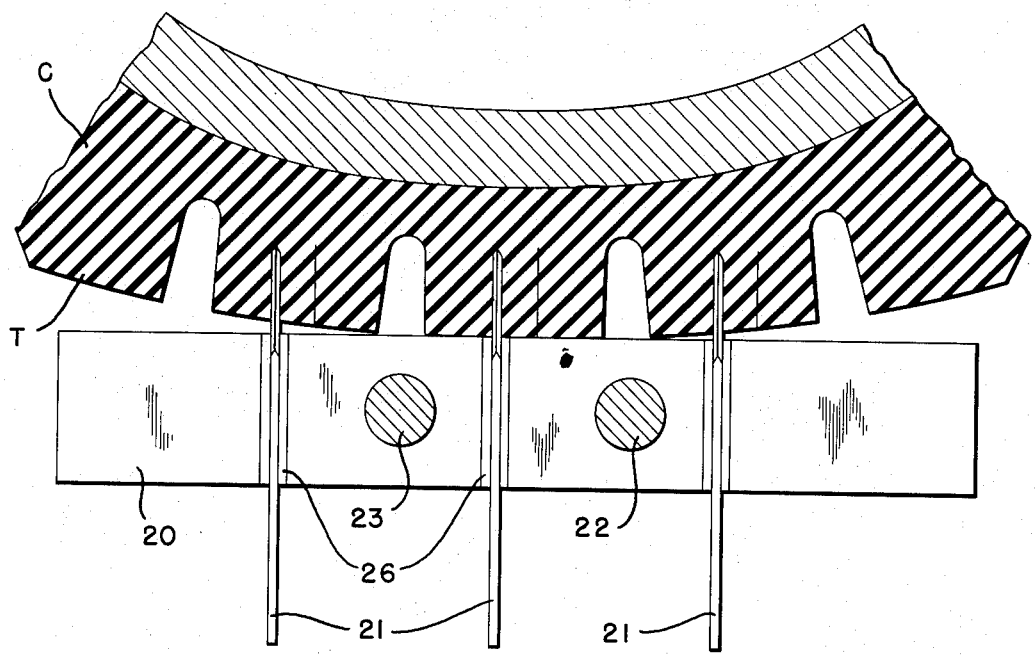
Fig. 5 is an enlarged sectional view taken on the line V—V of Fig. 2.

Adjustably secured to and extending from the lever member 10 on one side of the tool 11 is a pair of transversely spaced, elongated rollers 12 and 13 which, as best shown in Figs. 2 and 4, engage opposite sides of the rotating tire C and serve to guide and position the lever 10 and the tool 11 secured thereto with respect to the tread T. A similar pair of transversely spaced, elongated rollers 14 and 15 are adjustably secured to the lever member 10 on the other side of the tool 11 which also guide and position the tool 11 with respect to the tread T during the slitting or grooving thereof. The provision of two pairs of guide rollers enhances the stability of the apparatus in use.

A transversely extending plate 16 is welded to the lower end of the lever member 10 and freely rotatable rollers 17 and 18 are secured to the plate 16 adjacent opposite ends thereof. Rollers 17 and 18 allow transverse movement of the lever member 10 and the tool 11 attached thereto to permit the tool 11 to follow the tread in the event that the tire or wheel does not run true. The front peripheral edges 17a and 18a of the rollers 17 and 18 are preferably made sharp so that they bite into the floor or ground and prevent the apparatus from slipping under the tire as the tool 11 is pressed against the tread T of the tire C as it is rotated.

Figure 6:
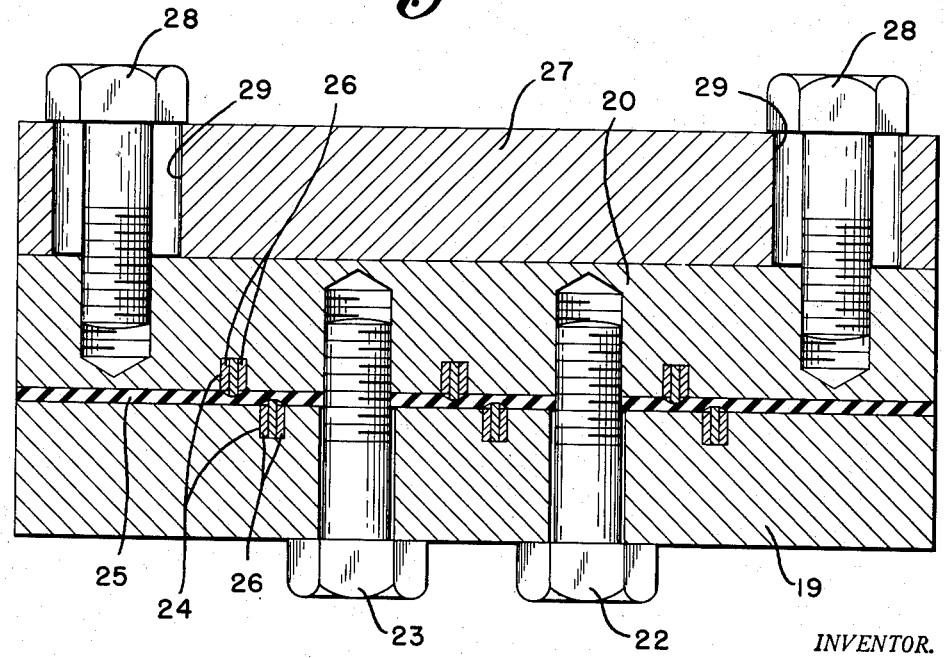
Fig. 6 is sectional view taken on the line VI—VI of Fig. 2.

The tool 11 includes two clamping blocks 19 and 20 between which a plurality of spaced, parallel, knives 21 are clamped by means of clamping bolts 22 and 23 which extend through block 19 and are threaded into block 20. The blades can be of a shape to slit the tread or groove the tread as desired. The blades 21 shown are for slitting the tread, i. e., for forming incision type cuts without removal of material. The extent to which the knives 21 extend from the blocks 19 and 20 and therefore the depth of cut that they may make may be adjusted by merely loosening the bolts 22 and 23 and sliding the knives in or out of the blocks 19 and 20 to the extent desired. As best shown in Fig. 6, adjacent knives 21 are alternately supported in grooves 24 formed in either block 19 or 20. This allows the knives 21 to be closely spaced laterally while still providing sufficient clearance between the adjacent knives 21 to allow the tread material between adjacent slits to easily pass between the adjacent knives. A sheet 25 of resilient rubber interposed between the blocks 19 and 20 ensures that sufficient clamping pressure is exerted on each of the knives 21 to anchor them securely between the blocks 19 and 20. Shims 26 interposed between the blades 21 and the sides of the grooves 24, allows the lateral spacing of the knives 21 to be varied by the use of shims of various thicknesses.

Block 20 is secured to a bar 27 by means of a screw 28 which extends through slots 29 in the bar 27 and threads into block 20. The slots 26 permit transverse adjustment of the blocks 19 and 20 and the knives 21 clamped therebetween to align the knives 21 with the tread of the tire in the event that the tread is off center with respect to the sidewalls of the tire. Bar 27 is welded to a sleeve 30 which is slidably received on the lever member 10 and is secured thereto by a set screw 31. The longitudinal position of the lacerating tool 11 may, therefore, be varied by merely loosening the set screw 31 and sliding the tool 11 along the lever member 10.

Figure 3:
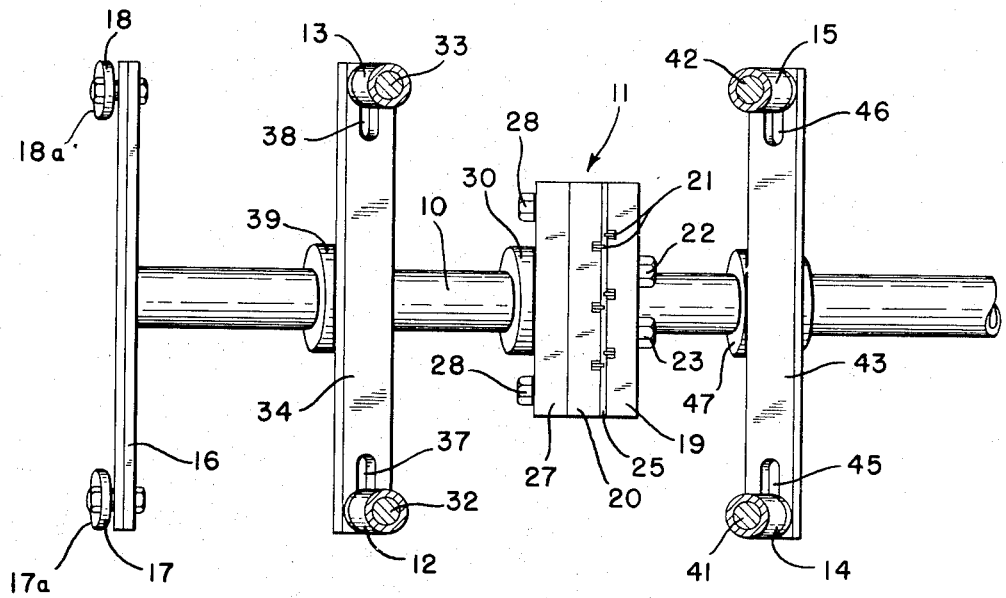
Fig. 3 is a plan view, partly in section taken in the direction of the arrows III—III of Fig. 2.

As best shown in Fig. 3, guide rollers 12 and 13 are rotatably mounted on shafts 32 and 33 respectively, which in turn are secured to the opposite ends of a cross bar 34 by nuts 35 and 36 (Fig. 4), threaded on the ends of the shafts 32 and 33 which extend through slots 37 and 38 provided in opposite ends of the cross bar 34. The slots 37 and 38 permit transverse adjustment of the rollers 12 and 13 so that the apparatus may be used on tires of various cross-sectional dimensions. Cross bar 34 is secured by welding to a sleeve 39 which is slidably received on the lever member 10 and secured thereto by a set screw 40 (Fig. 2).

Guide rollers 14 and 15 are similarly rotatably mounted on shafts 41 and 42 respectively which are secured to opposite ends of a cross bar 43 by nuts 44 threaded on the ends of the shafts 41 and 42 which extend through slots 45 and 46 provided in the opposite ends of the cross bar 43. The cross bar 43 is welded to a sleeve 47. Sleeve 47 is slidably mounted on the lever member 10 and secured thereto by a set screw 48. As best shown in Figs. 1 and 2, the cross bar 43 is welded to the sleeve 47 at an angle so that the rollers 14 and 15 extend at an angle towards the rollers 12 and 13. By this arrangement, it is possible to adjust the relative positions of the rollers 12, 13, 14 and 15 so that they engage the sides of the tire on substantially radial lines with respect to the center of rotation of the tire regardless of the size of the tire and will, therefore, rotate freely as the tire is rotated.

In utilizing the apparatus to slit or groove the tread of a tire while the tire is mounted on a vehicle, the wheel with the tire thereon is jacked up free of the ground as shown in Fig. 1. The knives 21 of the tool 11 are then adjusted to give the desired depth of cut and clamped between blocks 19 and 20 by the clamping bolts 22 and 23. The end of the lever member 10 to which the rollers 17 and 18 are attached, is then placed just under the tire as shown in Fig. 1, and guide rollers 12, 13, 14 and 15 adjusted so that their transverse spacing corresponds to the cross-sectional dimension of the tire and preferably adjusted longitudinally along the lever member 10 until they extend approximately toward the center of the tire. The blocks 19 and 20 are next adjusted transversely of the lever member 10 until the knives 21 are in proper alignment with the tread T of the tire C and clamped by the bolts 28. These adjustments, of course, once made for one size of tire need not be made again in lacerating the treads of other tires of the same size.

The tire C is then rotated by operation of the engine of the vehicle V or by the use of an external power source (not shown). As the tire C is rotated, the tool 11 is pressed against the tread T of the tire by the application of force against the upper end of the lever member 10. Should the tire or wheel be out of true, the rollers 17 and 18, upon which the lever member 10 is fulcrumed, permit the lever member 10 and the tool 11 secured thereto to move transversely so that the tool 11 will follow the tread T of the tire C.

From the above description it can be seen that there is provided apparatus for slitting or grooving the tread of a tire to increase the traction thereof, which is of a very simple, inexpensive construction and which may be effectively and efficiently used by comparatively unskilled operators. While a preferred form of the invention has been shown and described, it is to be understood that the above description and accompanying drawings are for the purpose of illustration only and not by the way of limitation and changes and modifications may be made therein within departing from the spirit and the scope of the invention.

Having thus described my invention, what I claim and desire to protect by Letters Patent is:

1. Apparatus for slitting or grooving the tread of a tire to increase the traction thereof comprising, an elongated lever member, a cutting element secured to and extending outwardly from said lever member intermediate the ends of said lever member, said lever member having a free end adapted to be manually grasped to apply a force thereto to pivot said lever member around the opposite end thereof to press said cutting element against the tread of a tire to thereby cut the tread, and means carried by said opposite end of said lever member permitting free transverse movement of said lever member in a direction substantially perpendicular to the direction of extension of said cutting element.

2. Apparatus for slitting or grooving the tread of a tire to increase the traction thereof comprising, an elongated lever member, a cutting element secured to and extending outwardly from said lever member intermediate the ends of said lever member, said lever member having a free end adapted to be manually grasped to apply a force thereto to pivot said lever member around the opposite end to press said cutting element against the tread of a tire to thereby cut said tread, and transversely spaced guide means secured to and extending from said lever member in the same general direction as said cutting elements and engageable with opposite sides of the tire during the cutting operation.

3. Apparatus for slitting or grooving the tread of a tire to increase the traction thereof comprising, an elongated lever member, a cutting element secured to and extending outwardly from said lever member intermediate the ends of said lever member, said lever member having a free end adapted to be manually grasped to apply a force thereto to pivot said lever member around its opposite end to press said cutting element against the tread of a tire to thereby cut said tread, transversely spaced guide means secured to and extending from said lever member in the same general direction as said cutting element and engageable with opposite sides of the tire during the cutting operation, and means carried and secured to said opposite end of said lever member permitting free transverse movement of said lever member in a direction substantially perpendicular to the direction of extension of the cutting element.

4. Apparatus for slitting or grooving the tread of a tire to increase the traction thereof comprising, an elongated lever member, a cutting element secured to and extending outwardly from said lever member intermediate its ends, said lever member having a free end adapted to be manually grasped to apply a force thereto to pivot said lever member around its opposite end to press said cutting element against the tread of a tire to thereby cut said tread, transversely spaced guide means secured to and extending from said lever in the same general direction as said cutting elements and engageable with opposite sides of the tire during the cutting operation, and rollers secured to said opposite end of said lever permitting free transverse movement of said lever member in a direction substantially perpendicular to the direction of extension of said cutting element.

5. Apparatus for slitting or grooving the tread of a tire to increase the traction thereof comprising, an elongated lever member, a cutting element secured to and extending outwardly from said lever member intermediate the ends of said lever member, said lever member having a free end adapted to be manually grasped to apply a force thereto to pivot said lever member around the opposite end thereof to press said cutting element against the tread of a tire to thereby cut said tread, transversely spaced elongated guide rollers secured to and extending from said lever member adjacent said cutting element and in the same general direction as said cutting element for engaging opposite sides of the tire during the cutting operation.

6. Apparatus for slitting or grooving the tread of a tire to increase the traction thereof comprising, an elongated lever member, a cutting element secured to and extending outwardly from said lever member intermediate its ends, said lever member having a free end adapted to be manually grasped to apply a force thereto to pivot said lever member around its opposite end to press said cutting elements against the tread of a tire to thereby cut the tread, a first pair of transversely spaced elongated guide rollers secured to and extending from said lever member on one side of said cutting element in the same general direction as said cutting element and engageable with opposite sides of the tire during the cutting operation, a second pair of transversely spaced guide rollers secured to and extending from said lever member on the other side of said cutting element in the same general direction as said cutting element but at an angle towards the first pair of guide rollers and engageable with opposite sides of the tire, said pairs of guide rollers being adjustable longitudinally along said elongated lever member whereby said pairs of guide members may be adjusted to engage the sides of said tire substantially radially with respect to the axis of rotation of said tire.

7. Apparatus for slitting or grooving the tread of a tire to increase the traction thereof comprising, an elongated lever member, a cutting element secured to and extending outwardly from said lever member intermediate the ends of said lever member, said lever member having a free end adapted to be manually grasped to apply a force thereto to pivot said lever member around the opposite end thereof to press said cutting element against the tread of a tire to thereby cut the tread, a first pair of transversely spaced elongated guide rollers secured to and extending from said lever member on one side of said cutting element in the same general direction as said cutting element and engageable with opposite sides of the tire, a second pair of transversely spaced guide rollers secured to and extending from said lever member on the other side of said cutting element in the same general direction as said cutting element but at an angle toward said first pair of guide rollers, said pairs of guide rollers being mounted for longitudinal adjustment along said lever member whereby said guide rollers may be adjusted to engage the sides of said tires substantially radially with respect to the axis of rotation of said tire, and rollers secured to said opposite end of said lever permitting free transverse movement of said lever member in a direction substantially perpendicular to the direction of said cutting element.

References Cited in the file of this patent

UNITED STATES PATENTS

| | | |
|---|---|---|
| 1,567,472 | Skiles | Dec. 29, 1925 |
| 2,000,129 | Dunnam | May 7, 1935 |
| 2,450,496 | Whiteley | Oct. 5, 1948 |